United States Patent
Kosaka

(10) Patent No.: US 11,811,984 B2
(45) Date of Patent: Nov. 7, 2023

(54) IMAGE PROCESSING SYSTEM, IMAGE PROCESSING APPARATUS AND METHOD OF CONTROLLING THE SAME, AND STORAGE MEDIUM

(71) Applicant: CANON KABUSHIKI KAISHA, Tokyo (JP)

(72) Inventor: Ryo Kosaka, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 360 days.

(21) Appl. No.: 17/029,116

(22) Filed: Sep. 23, 2020

(65) Prior Publication Data

US 2021/0090241 A1   Mar. 25, 2021

(30) Foreign Application Priority Data

Sep. 25, 2019   (JP) ................ 2019-174537

(51) Int. Cl.
| | |
|---|---|
| *H04N 1/00* | (2006.01) |
| *G06T 7/00* | (2017.01) |
| *G06N 3/08* | (2023.01) |
| *G06T 5/00* | (2006.01) |
| *G06V 30/10* | (2022.01) |
| *G06V 30/19* | (2022.01) |

(Continued)

(52) U.S. Cl.
CPC ........... *H04N 1/00331* (2013.01); *G06N 3/08* (2013.01); *G06T 5/003* (2013.01); *G06T 7/0004* (2013.01); *G06V 10/82* (2022.01); *G06V 30/1916* (2022.01); *G06V 30/19173* (2022.01); *G06V 30/412* (2022.01); *G06V 30/10* (2022.01)

(58) Field of Classification Search
CPC ... G06T 7/0002; G06T 7/0004; G06T 7/0006; G06T 5/001; G06T 5/003; G06T 5/005; G06N 3/08; G06N 3/084; G06V 30/10; G06V 10/82; G06V 30/412; G06V 30/1916; G06V 30/19173; H04N 1/00331
USPC ......... 382/112–113, 100–101, 105, 137, 306
See application file for complete search history.

(56) References Cited

U.S. PATENT DOCUMENTS

| | | | |
|---|---|---|---|
| 2013/0279759 A1* | 10/2013 | Kagarlitsky | G06V 10/751 382/105 |
| 2018/0240219 A1* | 8/2018 | Mentl | G06N 3/08 |
| 2018/0262291 A1* | 9/2018 | Doster | G06N 3/08 |

(Continued)

FOREIGN PATENT DOCUMENTS

JP   H11232382 A   8/1999

OTHER PUBLICATIONS

H. Cao and V. Govindaraju, "Preprocessing of Low-Quality Handwritten Documents Using Markov Random Fields," in IEEE Transactions on Pattern Analysis and Machine Intelligence, vol. 31, No. 7, pp. 1184-1194, Jul. 2009, doi: 10.1109/TPAMI.2008.126. (Year: 2009).*

*Primary Examiner* — Kenny A Cese
(74) *Attorney, Agent, or Firm* — ROSSI, KIMMS & McDOWELL LLP

(57) ABSTRACT

An image processing apparatus obtains first image data as correct image data, and second image data generated by deteriorating image quality of the first image data as input image data, and generates learning data that links the correct image data with the input image data, and learns a neural network using the generated learning data, so that the image processing apparatus generates a learning model used to convert input image data.

17 Claims, 21 Drawing Sheets

(51) Int. Cl.
    *G06V 10/82*     (2022.01)
    *G06V 30/412*     (2022.01)

(56) References Cited

U.S. PATENT DOCUMENTS

2019/0281170 A1* 9/2019 Yokogawa ......... H04N 1/00029
2020/0074234 A1* 3/2020 Tong .................... G06V 10/774
2020/0167885 A1* 5/2020 Kimura ................ G06T 7/0002

\* cited by examiner

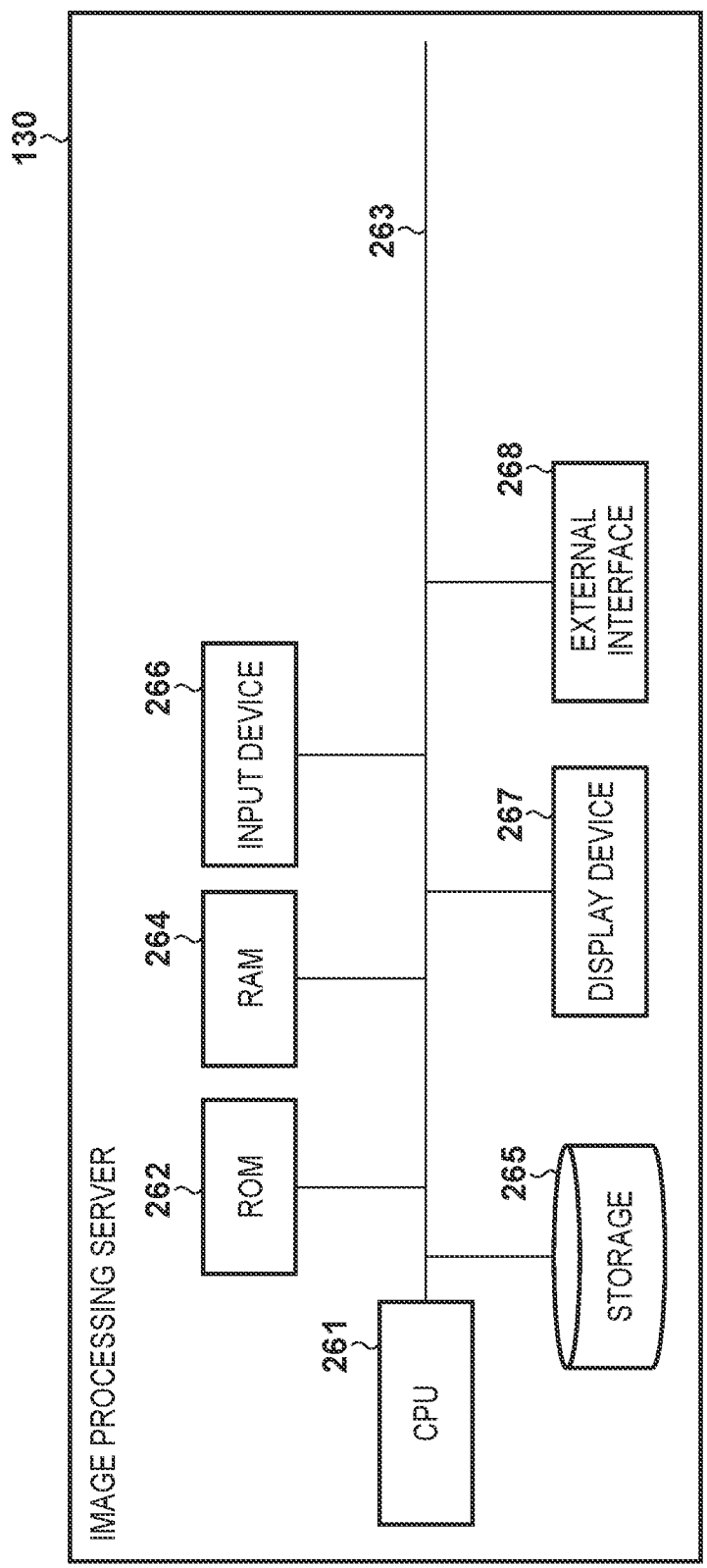

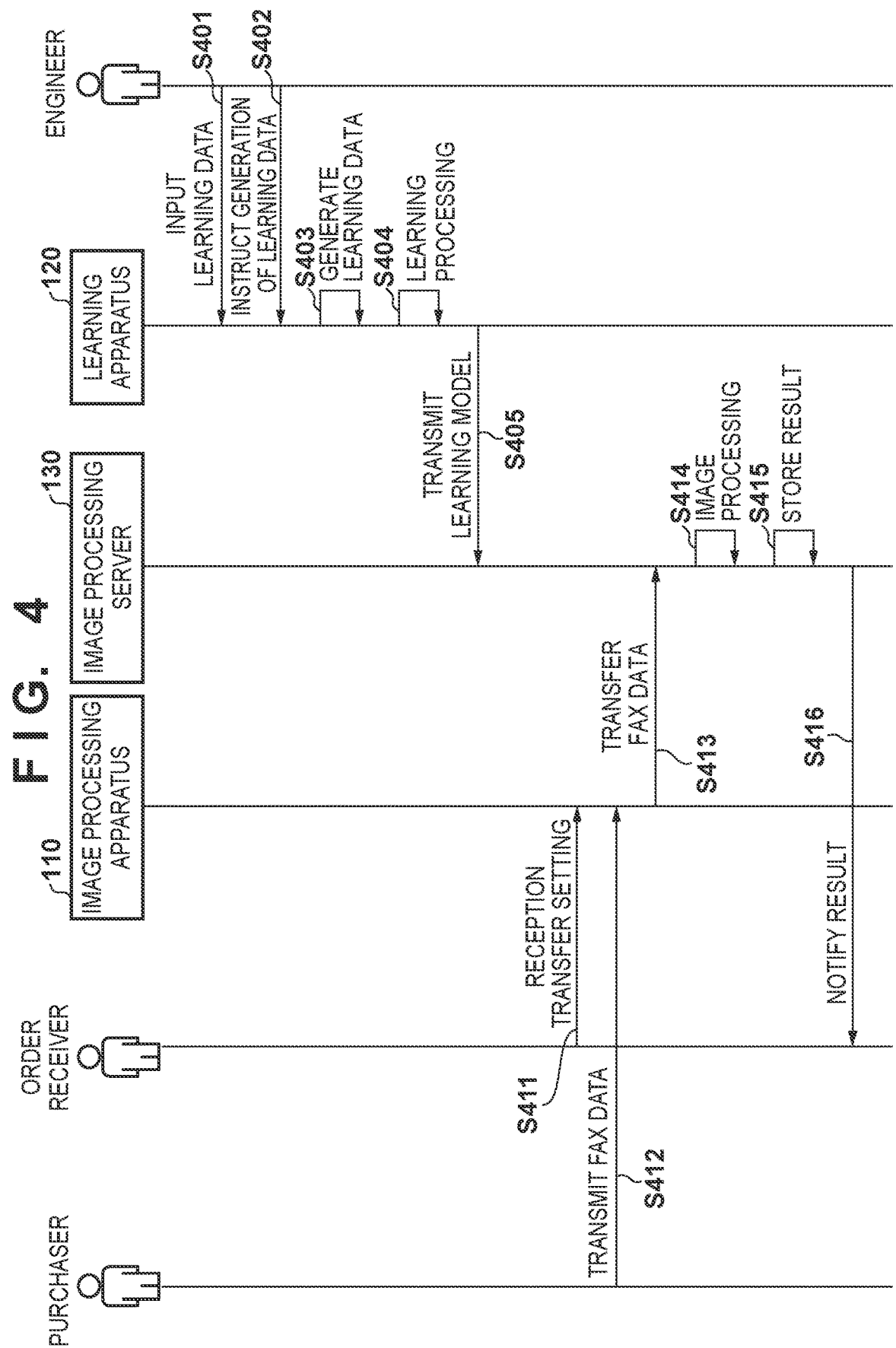

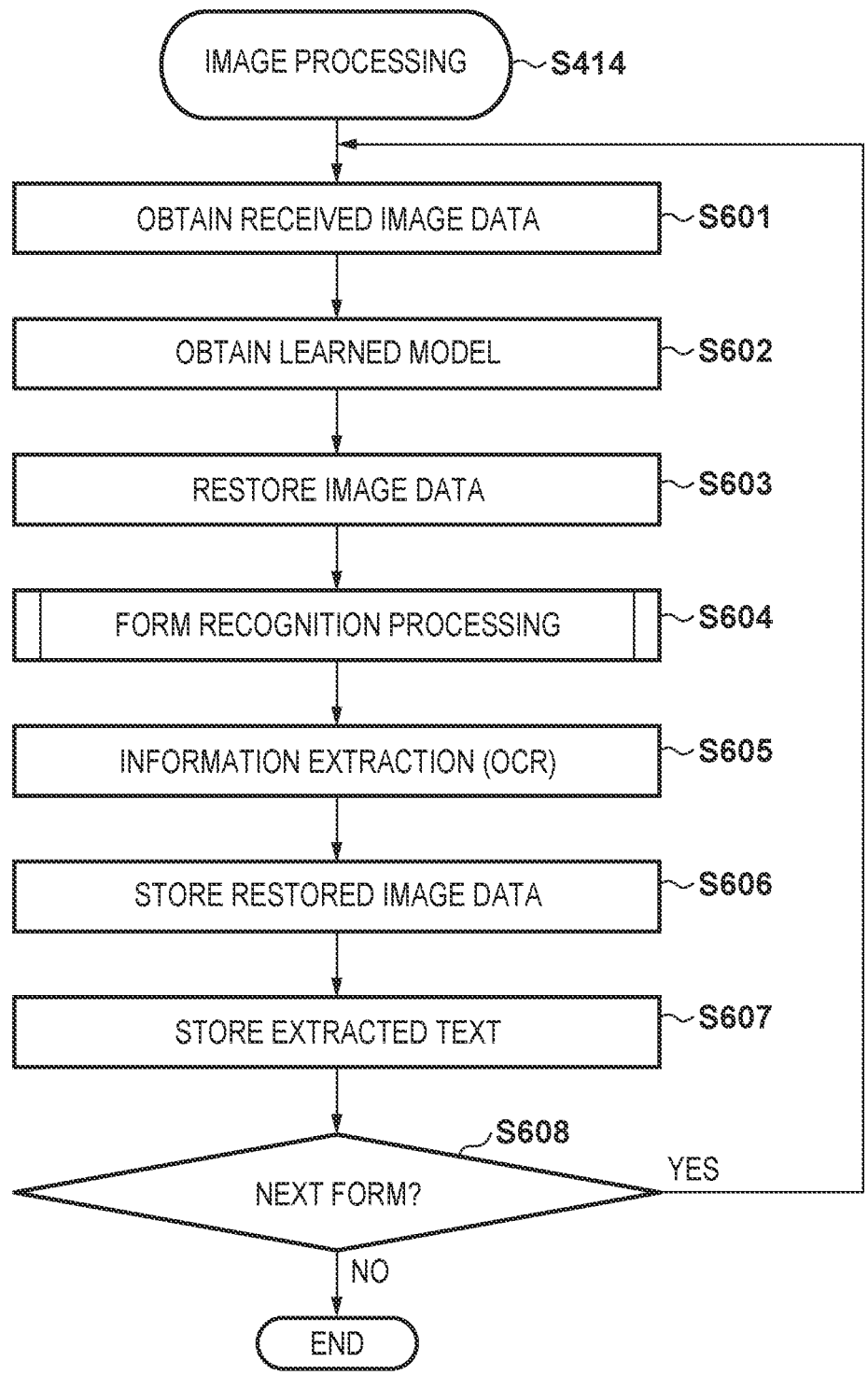

FIG. 7B
| ID | FORM IMAGE DATA | RULED LINE INFORMATION |
|---|---|---|
| 1 | 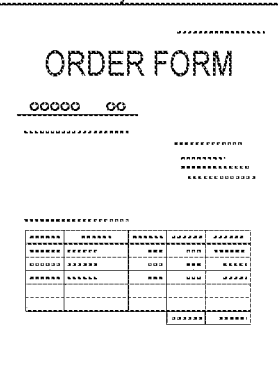 711 ORDER FORM | 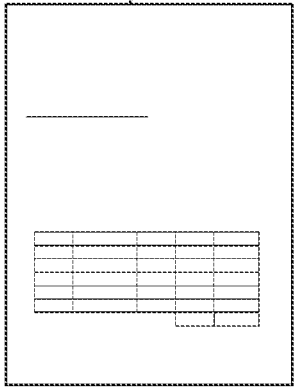 721 |
| 2 | 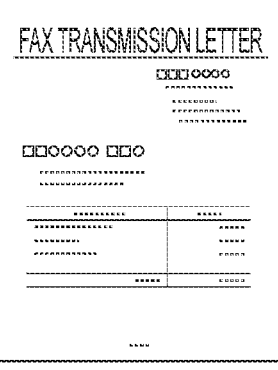 712 FAX TRANSMISSION LETTER | 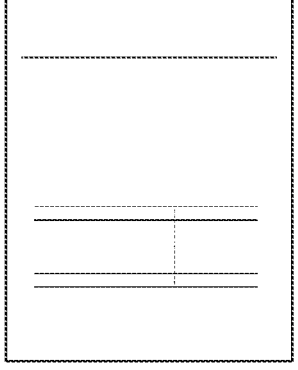 722 |
| 3 | 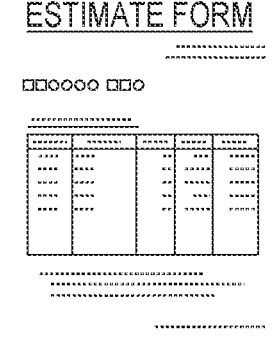 713 ESTIMATE FORM | 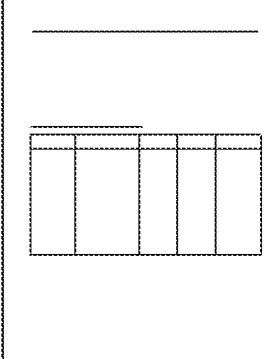 723 |

FIG. 8A

ISSUANCE DATE: 1, JUNE, 2019

ORDER SHEET

□□ INC.

○○ INC.

I ORDER AS FOLLOWING.

〒xxx-xxxx
△△△, NERIMA-KU, TOKYO
03-XXXX-XXXX

ORDER SHEET NUMBER : 1 2 3 4 5

| CODE | MERCHANDISE NAME | QUANTITY | UNIT PRICE | MONEY AMOUNT |
|------|------------------|----------|------------|--------------|
| 2032 | PART A | 200 | 450 | 90,000 |
| 5521 | PART B | 20 | 120 | 2,400 |
| 3294 | PART C | | 30 | 150 | 4,500 |
| | | | | |
| | | | | |
| | | | TOTAL | 96,900 |

FIG. 8B
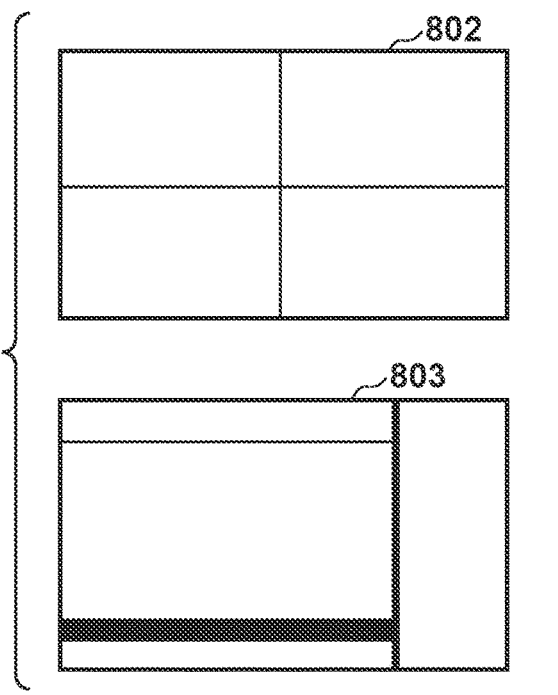
FIG. 8C
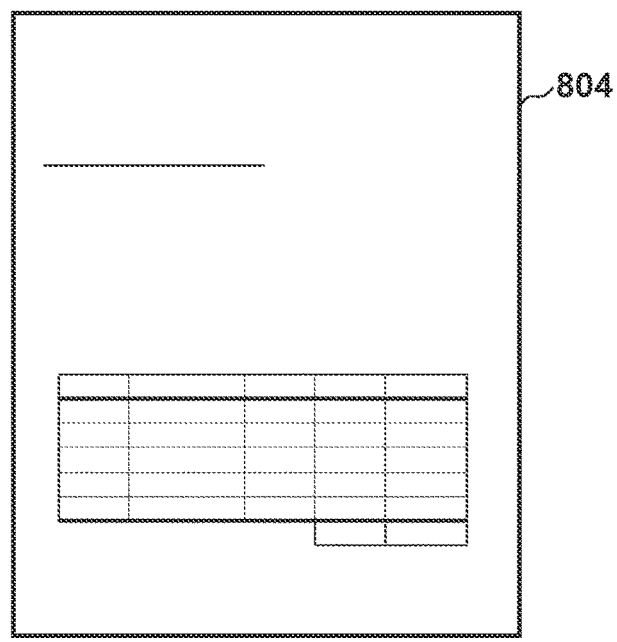
FIG. 8D
| ID | FORM NAME | SIMILARITY |
|---|---|---|
| 1 | ORDER FORM | 99% |
| 2 | FAX TRANSMITTAL LETTER | 28% |
| 3 | ESTIMATE FORM | 5% |

FIG. 9A

ISSUANCE DATE:1,JUNE, 2019

ORDER SHEET

□□ INC.

○○ INC.

I ORDER AS FOLLOWING.

〒xxx-xxxx
△△△, NERIMA-KU, TOKYO
03-XXXX-XXXX

ORDER SHEET NUMBER : 1 2 3 4 5

| CODE | MERCHANDISE NAME | QUANTITY | UNIT PRICE | MONEY AMOUNT |
|---|---|---|---|---|
| 2032 | PART A | 200 | 450 | 90,000 |
| 5521 | PART B | 20 | 120 | 2,400 |
| 3294 | PART C | 30 | 150 | 4,500 |
| | | | TOTAL | 96,900 |

FIG. 9B
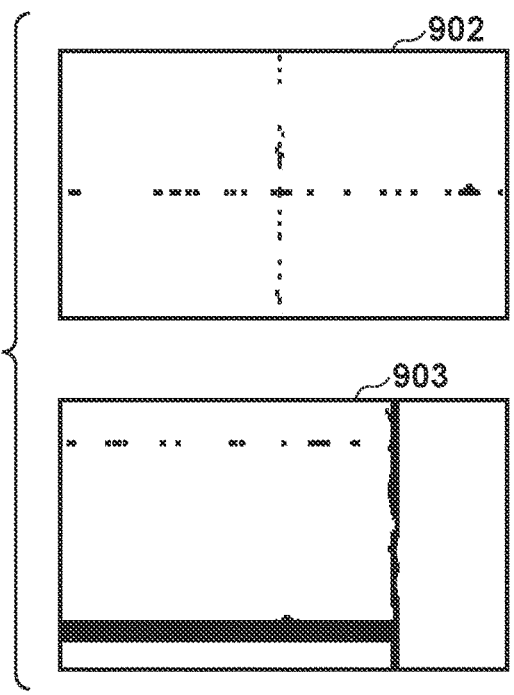
FIG. 9C
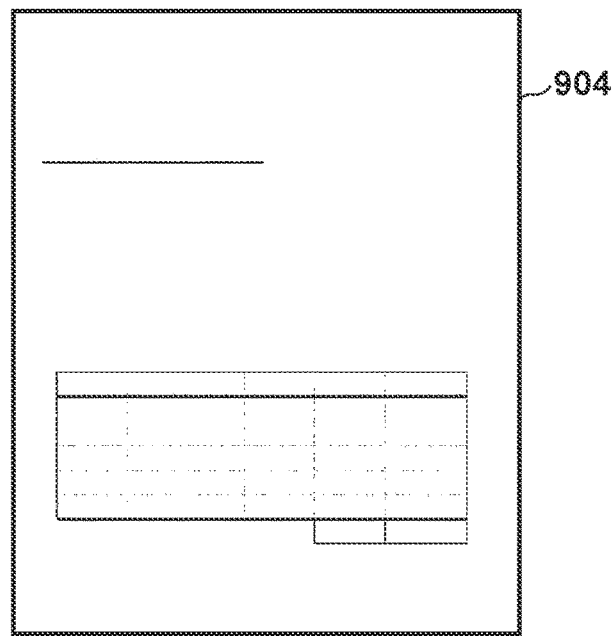
FIG. 9D
| ID | FORM NAME | SIMILARITY |
|---|---|---|
| 1 | ORDER FORM | 40% |
| 2 | FAX TRANSMITTAL LETTER | 68% |
| 3 | ESTIMATE FORM | 18% |

FIG. 10A

ISSUANCE DATE:1,JUNE, 2019

ORDER SHEET

□□ INC.

○○ INC.

I ORDER AS FOLLOWING.

〒xxx-xxxx
△△△, NERIMA-KU, TOKYO
03-XXXX-XXXX

ORDER SHEET NUMBER : 1 2 3 4 5

| CODE | MERCHANDISE NAME | QUANTITY | UNIT PRICE | MONEY AMOUNT |
|------|------------------|----------|------------|--------------|
| 2032 | PART A | 200 | 450 | 90,000 |
| 5521 | PART B | 20 | 120 | 2,400 |
| 3294 | PART C | 30 | 150 | 4,500 |
| | | | TOTAL | 96,900 |

FIG. 10B
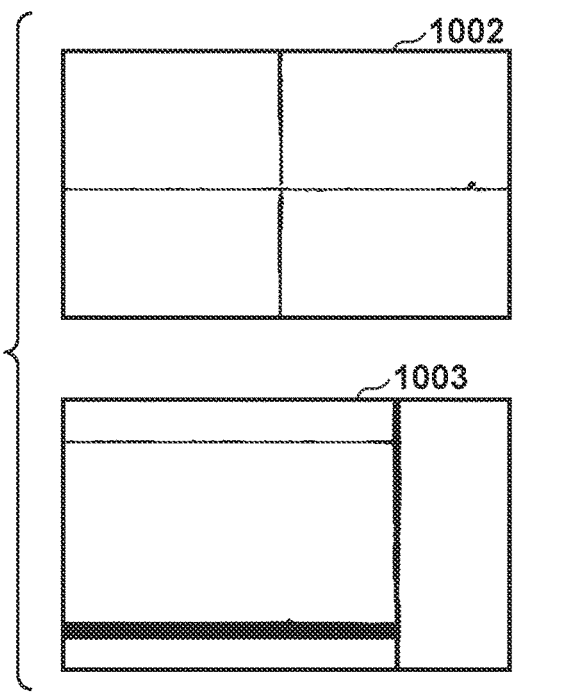
FIG. 10C
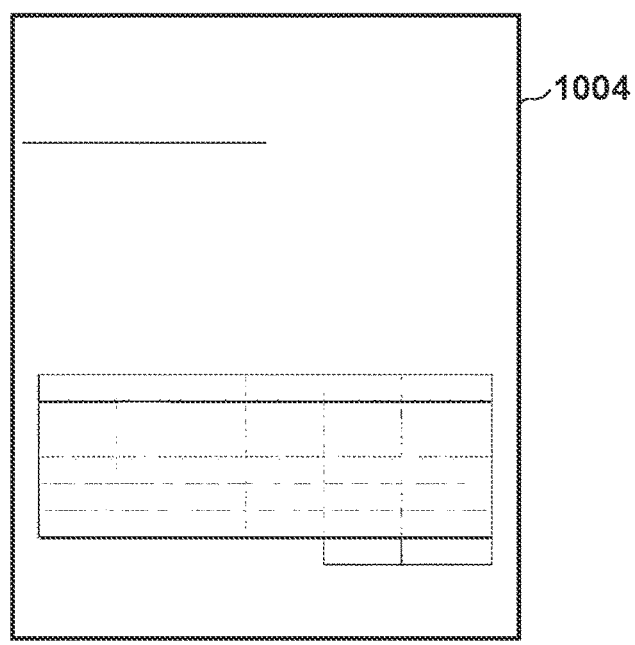
FIG. 10D
| ID | FORM NAME | SIMILARITY |
|---|---|---|
| 1 | ORDER FORM | 89% |
| 2 | FAX TRANSMITTAL LETTER | 44% |
| 3 | ESTIMATE FORM | 13% |

FIG. 11

| | INPUT IMAGE DATA | CORRECT IMAGE DATA |
|---|---|---|
| SAMPLE 1 | | |
| SAMPLE 2 | | |
| SAMPLE 3 | | |
| SAMPLE 4 | | |
| SAMPLE 5 | | |

FIG. 12A

| | INPUT IMAGE | CORRECT IMAGE |
|---|---|---|
| SAMPLE 1 | 大 (1202, 1201) | 大 |
| SAMPLE 2 | 機 | 機 |
| SAMPLE 3 | 電 | 電 |
| SAMPLE 4 | 驚 (1203) | 驚 |

FIG. 12B

| | SAMPLE 1 | | SAMPLE 2 | |
|---|---|---|---|---|
| | DETERIORATED IMAGE | RESTORED IMAGE | DETERIORATED IMAGE | RESTORED IMAGE |
| IMAGE | 瀰 (1211) | 源 (1212) | D (1213) | D (1214) |
| EXTRACTED TEXT (OCR) | 瀧 | 源 | O | D |

FIG. 14B
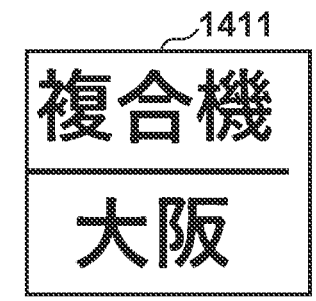
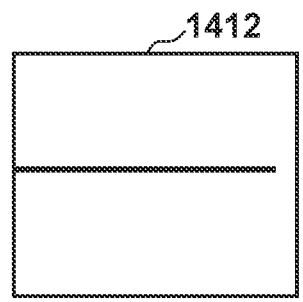
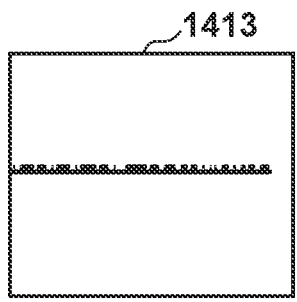
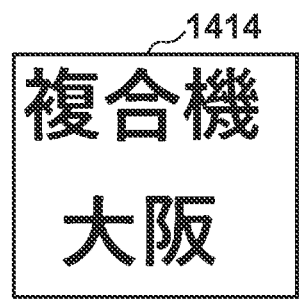
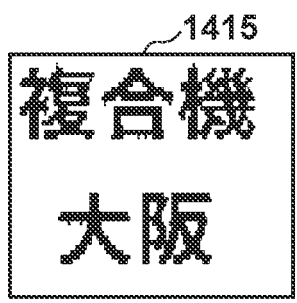

IMAGE PROCESSING SYSTEM, IMAGE PROCESSING APPARATUS AND METHOD OF CONTROLLING THE SAME, AND STORAGE MEDIUM

BACKGROUND OF THE INVENTION

Field of the Invention

The present invention relates to an image processing system, an image processing apparatus and a method of controlling the same, and a storage medium.

Description of the Related Art

Conventionally, in order to quickly and properly communicate necessary information, an organization such as a company that conducts an order placement and receiving task or an application examination task transmits/receives a form document such as an estimate form, an order form, or an application form by an information communication means such as mail, email, or FAX (facsimile). In these, the FAX has widely been used as a useful information communication means because communication networks have been established in many countries and regions, and the immediacy and reliability are high as compared to other information communication means.

In general, a person in charge in a company that conducts such a task specifies a form document from an enormous number of form documents to be handled, and performs processing according to a workflow for each form document. For example, when adding a file name to a received form document in accordance with a predetermined rule and storing it in a predetermined location, it is necessary to visually confirm a form type, a partner company name, a date, and the like, manually add a file name, and store the form document in a predetermined folder. Additionally, for example, when inputting data items determined for each specified form document to a predetermined task system provided in the company, the contents of the predetermined items described in the form document are visually confirmed and manually input. In recent years, to efficiently perform the series of operations, an effort to automate the task is being taken by applying form recognition processing and character recognition (OCR) processing to the document image data of a received form document. This makes it possible to automatically specify a form document and switch the workflow, automatically add a file name and automatically select a storage destination, or automatically input the character strings of an OCR result of a specified form document to a task system. Another effort to improve the accuracy of OCR is also being taken by narrowing down an OCR target area of document image data to be processed to an OCR target area linked with a specified form.

However, in the document image data of a form document sent by email or FAX, the image is often deteriorated by scan processing, compression processing, resolution/tone count reduction processing, or the like. Particularly in FAX, image data of low quality in which the communication data amount is decreased is often transmitted to suppress the communication cost (the communication time and the communication band). More specifically, an image processing apparatus such as an MFP (Multi-Function Peripheral) with a FAX transmission function converts the resolution to a resolution (for example, 200×200 dpi) lower than the read resolution (for example, 600×600 dpi) of device specifications, or converts multilevel data into binary data. Image data whose data amount is thus decreased is transmitted by FAX. Hence, an image processing apparatus such as an MFP with a FAX reception function receives image data of low quality. In such image data of low quality, image quality deterioration such as a partially lost ruled line in a form or noise around a ruled line occurs.

In form recognition processing, collation with a form registered in advance is performed using ruled line information included in image data, thereby identifying a form. At this time, if image quality deterioration such as a lost ruled line is included in the input image data, ruled line information cannot correctly be extracted. Hence, a sufficient form recognition accuracy cannot be obtained. As a result, automatic workflow switching as described above cannot accurately be executed, and many manual input or correction operations occur, resulting in a low task efficiency.

To cope with this problem, there is known a technique of correcting lost ruled line information from deteriorated image data. Japanese Patent Laid-Open No. H11-232382 describes a technique of specifying a line segment in which a ruled line is lost from deteriorated image data and connecting lost line segments, thereby restoring a line segment.

In the above-described conventional technique, however, since run-length data having a predetermined length or more is extracted from acquired image data, and the loss of a ruled line is determined based on the continuity or distance of run-length data in the vicinity, a sufficient restoration accuracy cannot always be obtained depending on the degree of deterioration of the ruled line. Particularly, in a deteriorated image such as a FAX image in which a ruled line is partially lost like a broken line, the run-length data of a predetermined length or more cannot be extracted. In addition, restoration of a ruled line may be impossible because, for example, the continuity of the line segment cannot be determined. As a result, since the extraction accuracy of ruled line information cannot be improved, it may be impossible to improve the form recognition accuracy.

SUMMARY OF THE INVENTION

An aspect of the present invention is to eliminate the above-mentioned problem with conventional technology.

A feature of the present invention is to provide a technique of improving an extraction accuracy of ruled line information by extracting ruled line information based on image data in which information lost by deterioration of an image is restored.

According to a first aspect of the present invention, there is provided an image processing apparatus comprising: at least one processor and at least one memory configured to perform: obtaining first image data as correct image data, and second image data generated by deteriorating image quality of the first image data as input image data, and generating learning data that links the correct image data with the input image data; and learning a neural network using the generated learning data, thereby generating a learning model used to convert input image data.

According to a second aspect of the present invention, there is provided a method of controlling an image processing apparatus, comprising: obtaining first image data as correct image data, and second image data generated by deteriorating image quality of the first image data as input image data, and generating learning data that links the correct image data with the input image data; and learning a neural network using the generated learning data, thereby generating a learning model used to convert input image data.

According to a third aspect of the present invention, there is provided an image processing system comprising: a learning apparatus configured to obtain first image data as correct image data, and second image data generated by deteriorating image quality of the first image data as input image data, generate learning data that links the correct image data with the input image data, and learn a neural network using the generated learning data, thereby generating a learning model used to convert input image data; and an image conversion apparatus configured to convert the input image data using the learning model generated by the learning apparatus to generate output image data.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2C is a block diagram for explaining the hardware arrangement of an image processing server according to the first embodiment;

FIG. 4 depicts a view for explaining a use sequence of the image processing system according to the first embodiment;

FIG. 6 is a flowchart for explaining image processing by the image processing server in step S414 of FIG. 4;

FIG. 7B depicts a view for explaining form image data registered in advance in a form database;

FIGS. 8A to 8D depict views for explaining examples of form image data in which image quality deterioration has not occurred, and ruled line information extracted from the form image data and similarity according to the first embodiment;

FIGS. 9A to 9D depict views for explaining examples of form image data in which image quality deterioration has occurred, and ruled line information extracted from the form image data and similarity according to the first embodiment;

FIGS. 10A to 10D depict views for explaining examples of form image data (restored image data) restored in the first embodiment, and ruled line information extracted from the form image data and similarity;

FIG. 11 depicts a view showing examples of learning models each of which links input image data that is deteriorated image data with correct image data in the first embodiment;

FIG. 12A depicts a view showing an example of learning data used by a learning apparatus according to the second embodiment to generate a learning model for restoring a character shape;

FIG. 12B depicts a view showing an example of the effect of improving image quality by the learning model generated by the learning data shown in FIG. 12A;

FIG. 14B depicts a view showing an example of image data generated in each processing step shown in FIG. 14A.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Also, a plurality of features may be arbitrarily combined.

First Embodiment

Figure 1:
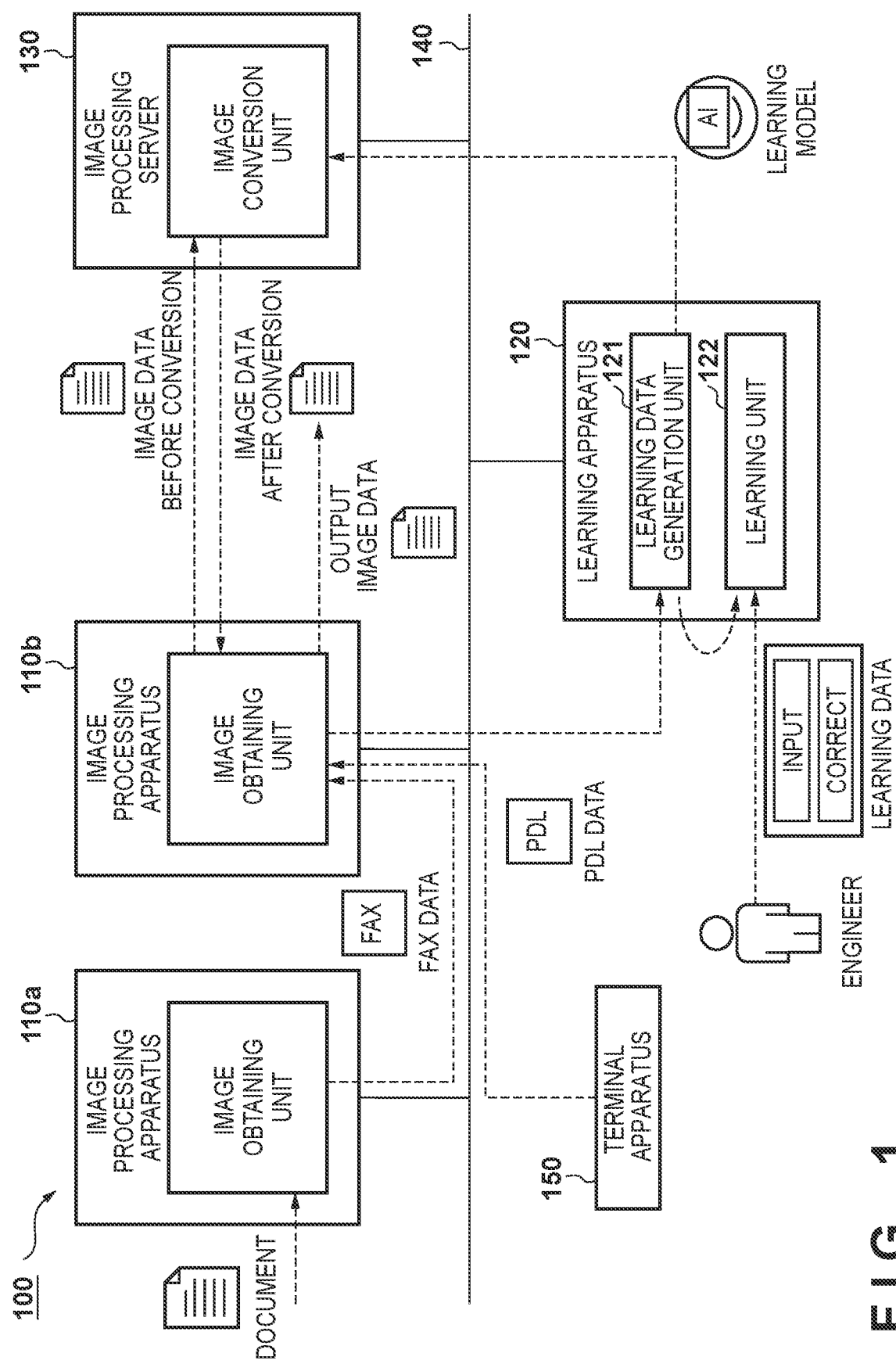
FIG. 1 depicts a view for explaining the overall arrangement of an image processing system according to the first embodiment.

FIG. 1 depicts a view for explaining the overall arrangement of an image processing system according to the first embodiment.

An image processing system 100 includes an image processing apparatus 110, a learning apparatus 120, an image processing server 130, and a terminal apparatus 150, and these are connected to each other via a network 140. Note that each of the image processing apparatus 110, the learning apparatus 120, and the image processing server 130 may include not a single apparatus but a plurality of apparatuses connected to the network 140. Here, FIG. 1 shows an arrangement example in which two image processing apparatuses 110a and 110b are connected as the image processing apparatus 110. More specifically, for example, the system operates such that FAX data transmitted from the image processing apparatus 110a is received by the image processing apparatus 110b and printed by the image processing apparatus 110b. Note that for the sake of simplicity, the image processing apparatus will be expressed as the image processing apparatus 110a in a description on the transmitting side, as the image processing apparatus 110b in a description on the receiving side, and as the image processing apparatus 110 in a description common to both the transmitting and receiving sides hereinafter.

The image processing apparatus 110 is implemented by an MFP or the like capable of implementing a plurality of functions such as copy, print, scan, and FAX. The image processing apparatus 110a performs image processing for a scan image obtained by scanning a document including a character image to generate FAX data, and transmits the FAX data to the image processing apparatus 110b via the network 140. The image processing apparatus 110b performs image processing for the FAX data received from the image processing apparatus 110a to generate image data (deteriorated image data) before conversion based on the FAX data, and transmits the image data to the image processing server 130 via the network 140.

The terminal apparatus 150 is a personal computer or a tablet capable of transmitting a print job to the image processing apparatus 110. When a user executes a print instruction via an operation unit (not shown), the terminal apparatus 150 transmits a print job (including PDL data) to the image processing apparatus 110 via the network 140. The image processing apparatus 110 performs print processing in accordance with the print job from the terminal apparatus 150, and transmits the PDL data to the learning apparatus 120 via the network 140.

The learning apparatus 120 includes a learning data generation unit 121, and a learning unit 122. The learning data generation unit 121 generates correct image data and input image data from the PDL data received from the image processing apparatus 110, and holds the pair of generated image data as learning data. The learning unit 122 performs learning of parameters or the like of a neural network using the learning data generated by the learning data generation unit 121, or learning data that is a pair of input image data and correct image data provided by an engineer. A learning model for image restoration is thus generated. The learning apparatus 120 transmits the learning data generated in the above-described way to the image processing server 130 via the network 140.

The image processing server 130 functions as an image conversion unit that performs image conversion for the image data before conversion, which is obtained by the image processing apparatus 110. That is, the image processing server 130 performs, for the image data (deteriorated image data) before conversion, conversion by a neural network using the learning model generated by the learning apparatus 120, thereby obtaining image data (image data of high quality) after conversion. As one type of machine learning method using a neural network, deep learning using a multilayer neural network can be used. The image processing server 130 transmits the thus obtained image data after conversion to the image processing apparatus 110 again. The image processing apparatus 110 obtains the image data (image data of high quality) after conversion, which is received from the image processing server 130, as output image data, and performs print output, transmission to a transmission destination desired by the user, and storage in the storage unit of the image processing apparatus 110 based on the output image data.

The network 140 is implemented by a LAN, public network (WAN), or the like, and connects the image processing apparatus 110, the learning apparatus 120, the image processing server 130, and the terminal apparatus 150 to each other to perform data transmission/reception between the apparatuses.

To implement the above-described image processing system, the image processing apparatus 110, the learning apparatus 120, and the image processing server 130 have the arrangements to be described below.

Figure 2A:
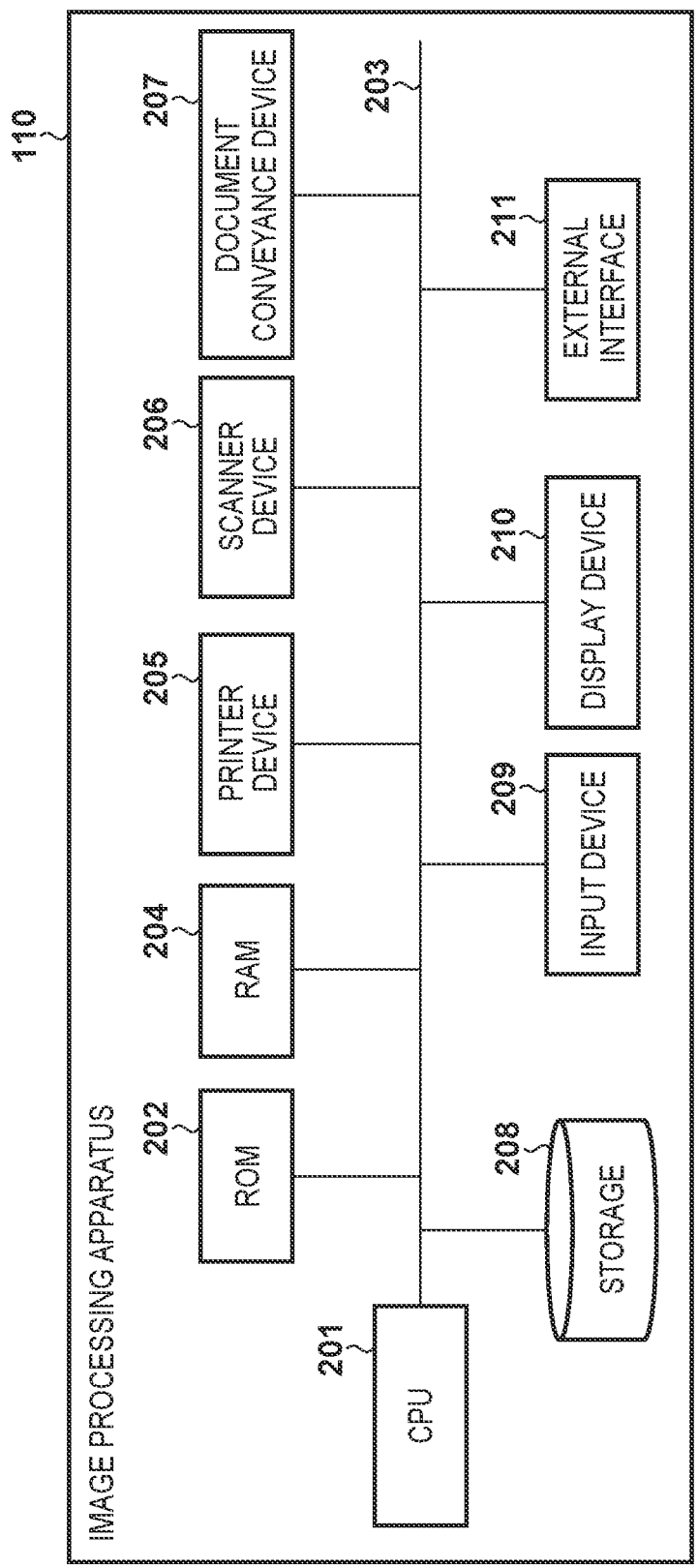
FIG. 2A is a block diagram for explaining the hardware arrangement of an image processing apparatus according to the first embodiment.
Figure 2B:
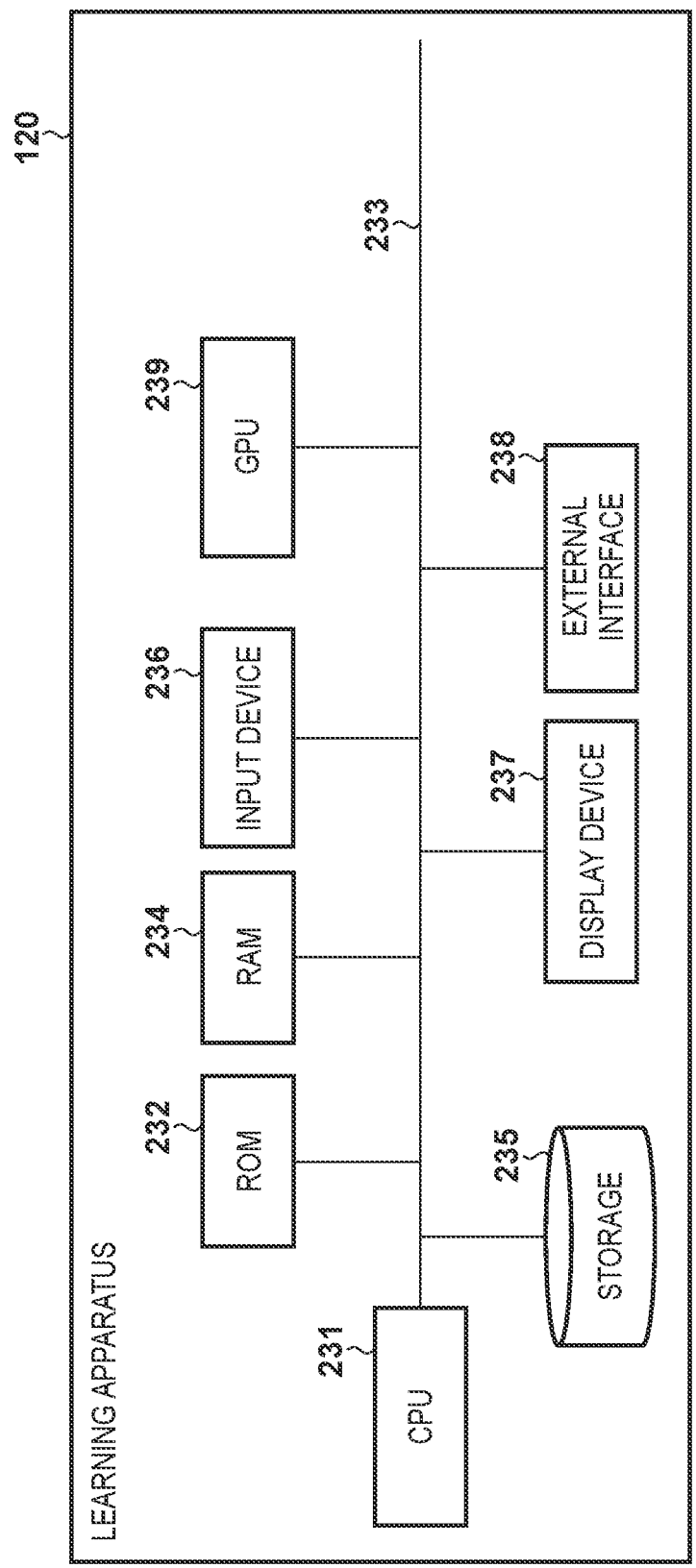
FIG. 2B is a block diagram for explaining the hardware arrangement of a learning apparatus according to the first embodiment.

FIG. 2A is a block diagram for explaining the hardware arrangement of the image processing apparatus 110. FIG. 2B is a block diagram for explaining the hardware arrangement of the learning apparatus 120. FIG. 2C is a block diagram for explaining the hardware arrangement of the image processing server 130.

Referring to FIG. 2A, the image processing apparatus 110 includes a CPU 201, a ROM 202, a RAM 204, a printer device 205, a scanner device 206, and a document feed device 207. The image processing apparatus 110 also includes a storage 208, an input device 209, a display device 210, and an external interface 211. The devices are communicably connected to each other via a bus 203.

The CPU 201 is a controller configured to totally control the image processing apparatus 110. The CPU 201 executes a boot program stored in the ROM 202, and deploys, on the RAM 204, an OS (Operating System) or a controller program stored in the storage 208. The deployed controller program is executed on the OS. The controller program is a program configured to control the image processing apparatus 110. The CPU 201 executes the controller program deployed on the RAM 204, thereby totally controlling the devices connected via the bus 203. The RAM 204 provides a temporary storage area for the main memory and a work area of the CPU 201.

The printer device 205 is a device (a printing device or an image forming device) that prints image data on paper (a printing material or a sheet). There exist an electrophotographic printing method using a photosensitive drum or a photosensitive belt, an inkjet method of discharging ink from a fine nozzle array and directly printing an image on paper, and the like, and any method is usable. The scanner device 206 is a device (image reading device) that scans a document such as paper using an optical reading device such as a CCD, and obtains an electrical signal corresponding to the image of the document and converts this, thereby generating scan image data. The document feed device 207 such as an ADF (Auto Document Feeder) feeds documents placed on a document table on the document feed device 207 one by one to the scanner device 206. In addition to a function of reading a document fed by the document feed device 207, the scanner device 206 may have a function of reading a document placed on the document table (not shown) provided in the image processing apparatus 110.

The storage 208 is a nonvolatile memory capable of read and write, such as an HDD, and various data such as the above-described controller program are recorded here. The input device 209 is a device (input device) including a touch panel, hard keys, and the like. The input device 209 accepts an operation instruction from the user. The input device 209 communicates instruction information including an instruction position and the like instructed by an operation instruction to the CPU 201. The display device 210 is a display device of, for example, liquid crystal or organic EL. The display device 210 displays display data generated by the CPU 201. Based on the instruction information received from the input device 209 and the display data displayed on the display device 210, the CPU 201 determines which operation has been done. According to the determination result, the CPU 201 controls the image processing apparatus 110, and generates new display data and causes the display device 210 to display it.

The external interface 211 transmits/receives various kinds of data including image data to/from an external apparatus via a network such as a LAN, a telephone network, or short distance wireless communication using infrared rays. The external interface 211 receives PDL data (data that describes drawing contents in a page description language or data in the PDL format) from an external apparatus such as the learning apparatus 120 or the terminal apparatus 150. The CPU 201 interprets the PDL data received by the external interface 211 to generate image data. The thus generated image data is sent to the printer device 205 and printed or stored in the storage 208. Additionally, when the external interface 211 receives image data (image data without deterioration) from an external apparatus such as the image processing server 130, the received image data can be printed by the printer device 205. In addition, the received image data can be stored in the storage 208 or transmitted to another external apparatus via the external interface 211.

The learning apparatus 120 shown in FIG. 2B includes a CPU 231, a ROM 232, a RAM 234, a storage 235, an input device 236, a display device 237, an external interface 238, and a GPU (graphics processing unit) 239. The units can transmit/receive data to/from each other via a bus 233.

The CPU 231 is a controller configured to control the entire learning apparatus 120. The CPU 231 executes a boot program stored in the ROM 232, and deploys, on the RAM 234, an OS or a program stored in the storage 235. On the OS thus deployed on the RAM 234, a learning data generation program and a learning program deployed on the RAM 234 are executed. The CPU 231 executes the learning data generation program, thereby generating learning data. In addition, the CPU 231 executes the learning program, thereby learning a neural network to perform image conversion. The CPU 231 controls the units via the bus 233.

The RAM 234 provides a temporary storage area for the main memory and a work area of the CPU 231. The storage 235 is a nonvolatile memory capable of read and write, and records the above-described learning program. The input device 236 is an input device including, for example, a pointing device, a keyboard, and the like. The display device 237 displays display data generated by the CPU 231. Based on instruction information received from the input device 236 and the display data displayed on the display device 237, the CPU 231 determines which operation has been done. According to the determination result, the CPU 231 controls the learning apparatus 120, and generates new display data and causes the display device 237 to display it. The external interface 238 receives input image data or correct image data from the image processing apparatus 110. The external interface 238 is also used to transmit a learning model to the image processing server 130. The GPU 239 is an image processing processor and performs learning of a neural network in cooperation with the CPU 231.

The image processing server 130 shown in FIG. 2C includes a CPU 261, a ROM 262, a RAM 264, a storage 265, an input device 266, a display device 267, and an external interface 268. The units can transmit/receive data to/from each other via a bus 263.

The CPU 261 is a controller configured to control the entire image processing server 130. The CPU 261 executes a boot program stored in the ROM 262, and deploys, on the RAM 264, an OS or a program stored in the storage 265. On the thus deployed OS, a server program similarly deployed on the RAM 264 is executed. The CPU 261 executes the server program, thereby performing OCR processing and conversion processing for processing target image data. The CPU 261 controls the units via the bus 263. The RAM 264 provides a temporary storage area for the main memory and a work area of the CPU 261. The storage 265 is a nonvolatile memory capable of read and write, and records the above-described image processing server program. The input device 266 is an input device including, for example, a pointing device, a keyboard, and the like. The display device 267 displays display data generated by the CPU 261. The external interface 268 transmits/receives various kinds of data including image data to/from an external apparatus via a network such as a LAN, a telephone network, or short distance wireless communication using infrared rays.

FIG. 4 depicts a view for explaining a use sequence of the image processing system 100 according to the first embodiment. A description will be made here using an example in which when a form such as an order form is sent from a purchaser to an order receiver (user) in an order placement and receiving task, the order receiver stores the image data of the form and text information included in the image data in a task system (image processing server 130). Note that the following description will be made using an example in which a form document is transmitted by FAX. However, the description can also be applied to a case in which the image data of a form document attached to email is processed. If a form document is sent by mail, the description can be applied by scanning the form document by the order receiver.

First, in step S401, an engineer in a maker that provides the image processing system 100 inputs learning data to cause the learning unit 122 of the learning apparatus 120 to execute learning of an image restoration model. Alternatively, in step S402, the engineer transmits a learning data generation instruction to the learning data generation unit 121 of the learning apparatus 120. Upon receiving the learning data generation instruction, in step S403, the learning data generation unit 121 generates learning data. Details of learning data input in step S401 or learning data generated in step S403 will be described later with reference to FIGS. 3A and 3B.

In step S404, the learning unit 122 executes learning of a neural network using the learning data input in step S401 or generated in step S403. Details of the learning processing of step S404 will be described later with reference to FIG. 5. When the learning processing of step S404 ends, in step S405, the learning unit 122 transmits a learning model to the image processing server 130. These processes are processes performed in advance before processes to be described below.

Next, in step S411, the order receiver does a setting to transfer image data at the time of FAX reception to a task system registered in advance. Next, in step S412, when the image processing apparatus 110 on the order receiver side receives FAX data transmitted from a FAX apparatus on the purchaser side, in step S413, the image processing apparatus 110 transfers the received FAX data to the image processing server 130 in accordance with the transfer setting done in step S411.

Accordingly, in step S414, the image processing server 130 executes image processing for image data restoration or information extraction using the learning model received from the learning apparatus 120 in step S405. Details of the image processing of step S414 will be described later with reference to FIG. 6. Next, in step S415, the image processing server 130 stores restored image data that is the restoration result of the image data generated in step S414 or a text as the information extraction result in a predetermined storage area provided in the image processing server 130. Finally, in step S416, the image processing server 130 notifies the order receiver of completion of processing. Note that as the notification method used here, for example, a method of displaying a notification of a processing completion job when the order receiver refers to the display device 237 of the image processing server 130 may be used. Alternatively, for example, a method of transmitting a notification of a processing completion job to a mail address or message account held by a login user who has made the reception transfer setting in step S411 may be used.

Figure 3A:
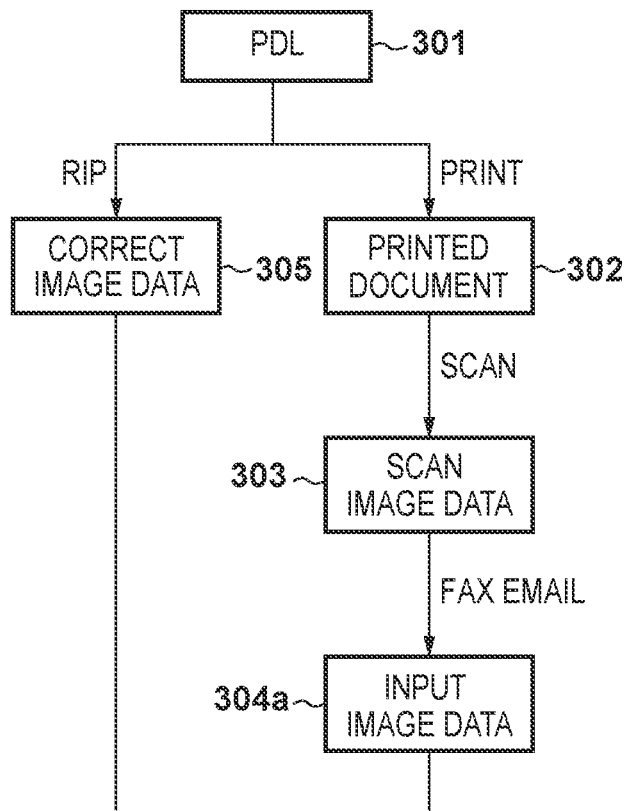
FIGS. 3A and 3B depict views for explaining a process of generating learning data in the first embodiment.
Figure 3B:
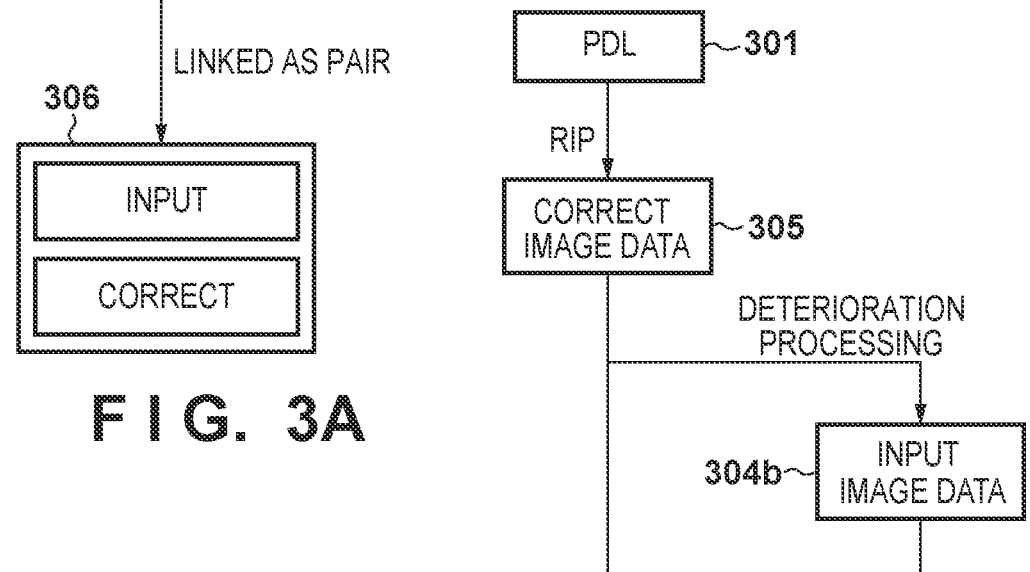

FIGS. 3A and 3B depict views for explaining a process of generating learning data in the first embodiment.

Learning data is data used by the learning unit 122 of the learning apparatus 120 to learn a neural network and create a learning model, and a pair of data (deteriorated image data)

before conversion and data (correct image data) after conversion is necessary. More specifically, for example, data (input image data=deteriorated image data) before conversion, which is image data of low quality obtained by FAX or scan, and data (correct image data) after conversion, which corresponds to image data of high quality before printing of a document, are prepared as learning data. A learning model is generated from the pair of input image data and correct image data, and the deteriorated image data is restored to original image data using the learning model.

Learning data that the engineer has input to the learning apparatus 120 in step S401 of FIG. 4 will be described first with reference to FIG. 3A. As shown in FIG. 3A, learning data 306 is data formed by a pair of correct image data and input image data. Correct image data 305 is directly obtained by RIP (rendering) of PDL data 301 (electronic document) sent from the terminal apparatus 150.

On the other hand, input image data 304a is generated using an information processing apparatus (not shown) under the development environment of the engineer. First, a printed document 302 obtained by printing the PDL data 301 is scanned to generate scan image data 303. Also, when the scan image data 303 is transmitted by FAX, email, or the like, thereby obtaining the input image data 304a that has undergone image processing such as resolution conversion or binarization processing for converting the data into FAX data or image processing such as JPEG compression processing. Here, the information processing apparatus used in the process of generating image data under the development environment of the engineer preferably has a characteristic similar to that of the printer device 205 or the scanner device 206 of the image processing apparatus 110. The input image data 304a and the correct image data 305, which are obtained in the above-described way, are linked as a pair, and extracted in a predetermined rectangular unit (for example, 512×512 pixels), thereby generating a plurality of learning data.

Learning data generation processing executed by the learning data generation unit 121 of the learning apparatus 120 in step S403 of FIG. 4 will be described next with reference to FIG. 3B. As shown in FIG. 3B, the correct image data 305 is directly obtained by RIP (rendering) of the PDL data 301 (electronic document) sent from the terminal apparatus 150. Input image data 304b is generated by conducting, for the correct image data 305, a simulation for simulatively reproducing print and scan and a simulation for reproducing deteriorated image data. More specifically, image processing of simulatively generating toner scattering in printing, read noise in scan, a blur caused by the read resolution, or the like is applied. Also, resolution conversion for reproducing deteriorated image data at the time of FAX transmission/reception, FAX image processing such as binarization, and scan image processing for reproducing deteriorated image data at the time of scan transmission, such as image correction according to a scanner device characteristic or image compression such as JPEG are applied. The input image data 304b and the correct image data 305, which are obtained in the above-described way, are linked as a pair, and extracted in a predetermined rectangular unit, thereby generating a plurality of learning data 306.

Note that in the learning data 306, one or both of the following two input image data are paired as input image data 304 with the correct image data 305, as shown in FIG. 3A. One is the input image data (deteriorated image) 304a actually obtained using the information processing apparatus. The other is the input image data (deteriorated image) 304b virtually input by a simulation, as shown in FIG. 3B.

If the input image data 304a generated using the information processing apparatus is used, learning for correcting image deterioration similar to that in the system operation can be performed. It is therefore possible to generate a learning model specialized to the use environment of the user. However, generation of the learning data takes a long time.

On the other hand, if the input image data 304b by simulation generation shown in FIG. 3B is used, a large amount of learning data can easily be generated. However, various image quality deteriorations in the system operation cannot be reproduced. Hence, the input image data 304b by simulation generation is learned as a learning set, thereby generating a general-purpose learning model that implements image quality deterioration. After that, a learning model more specialized to the use environment of the user is preferably generated by additionally learning the input image data 304a obtained using the information processing apparatus as a learning set.

Figure 5:
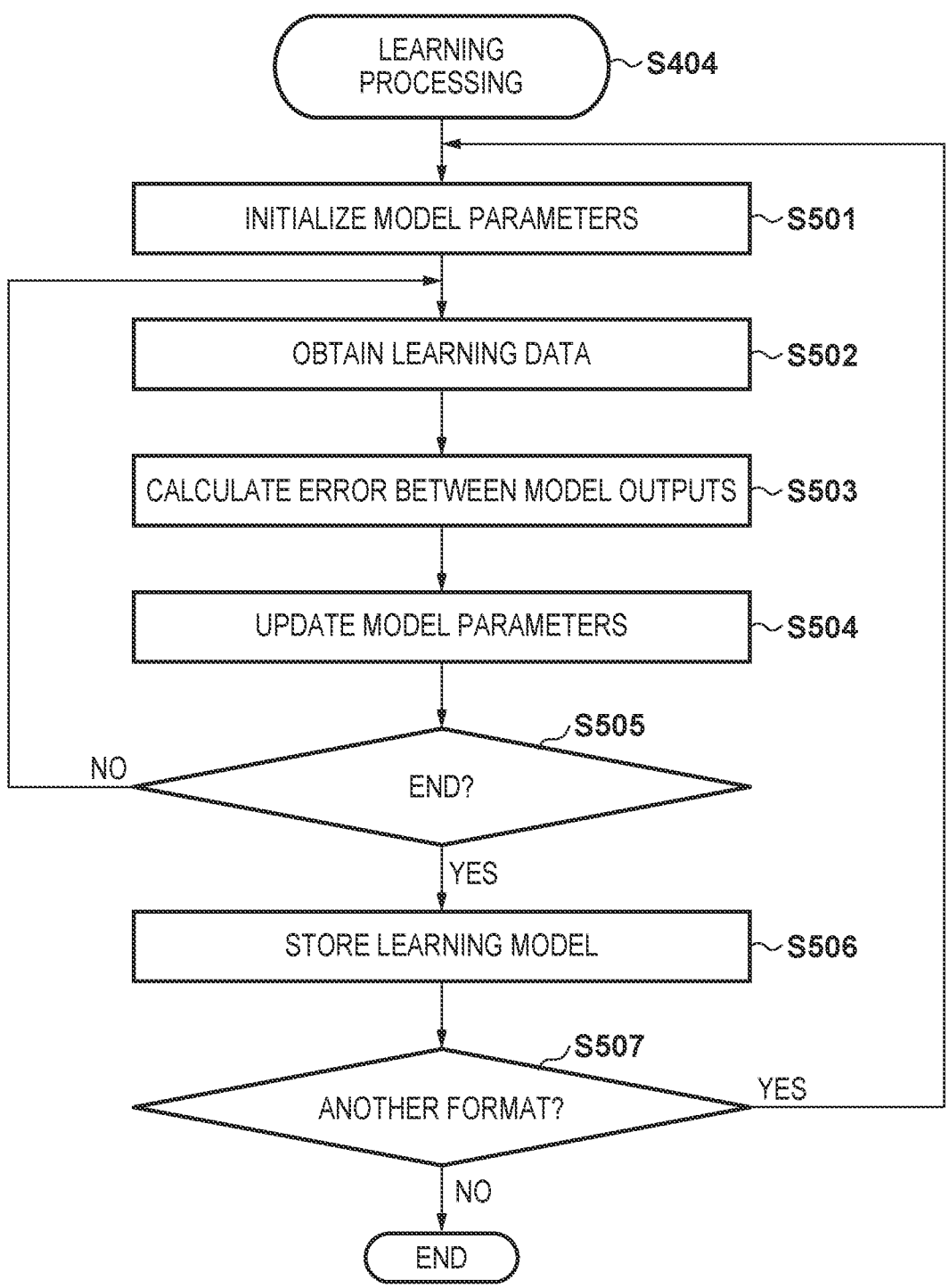
FIG. 5 is a flowchart for explaining learning processing of a learning model by the learning unit of the learning apparatus in step S404 of FIG. 4 according to the first embodiment.

FIG. 5 is a flowchart for explaining learning processing of a learning model by the learning unit 122 of the learning apparatus 120 in step S404 of FIG. 4. Note that the processing shown in FIG. 5 is achieved by executing, by the CPU 231 or the GPU 239, a program deployed on the RAM 234 of the learning apparatus 120, as described above.

First, in step S501, the CPU 231 initializes, using the GPU 239, the value of weight parameters forming a neural network to be used as a learning model. That is, the CPU 231, for example, sets the weight parameters forming the neural network to random values or resets the weight parameters by loading previously learned values. The process advances to step S502, and the CPU 231 obtains, using the GPU 239, a pair of input image data and correct image data whose conditions of the resolution, tone, and compression method (including a different compression ratio) match as learning data from the learning data generated in step S401 or S403 of FIG. 4. The process advances to step S503, and the CPU 231 performs, using the GPU 239, the following processing for the neural network prepared in step S501. That is, the CPU 231 executes an operation of obtaining an error between output image data obtained when the input image data is input and correct image data paired with the input image data. The process advances to step S504, and the CPU 231 executes, using the GPU 239, an operation generally called backpropagation for updating the values of the weight parameters of the learning model. The process advances to step S505, and the CPU 231 determines, using the GPU 239, whether the operation processing has been ended as many as a predetermined learning count using a predetermined number of learning data. Here, if the learning has not been ended as many as the predetermined learning count using the predetermined number of learning data, the CPU 231 returns to step S502 to repeat the above-described operations of steps S502 to S504.

If it is determined in step S505 that the learning has been ended as many as the predetermined learning count, the process advances to step S506. In step S506, the CPU 231 stores, using the GPU 239, the values of the weight parameters forming the learned neural network of the learning model in a storage unit such as the storage 235. The learning model obtained in step S506 does not simply replace the input image data scanned and transmitted with a low resolution with correct image data of a high resolution corresponding to the image data of the original document. The learning model obtained in step S506 is formed as an image conversion unit capable of restoring image data to original correct image data, including unknown image data. The process advances to step S507, and the CPU 231 determines whether to update the learning model using learning data of another data format. Here, if it is determined to update the learning model using learning data of another data format, the CPU 231 returns to step S501 to repeat the above-described processes of steps S501 to S506. On the other hand, if it is determined not to update the learning model using learning data of another data format, the learning model updating processing is ended.

Another data format means, for example, a case in which learning is performed using learning data obtained by a pair of correct image data and input image data, which are generated under conditions of different resolutions (for example, 600×600 dpi, 300×300 dpi, or 200×100 dpi). Alternatively, another data format to be generated means, for example, a case in which learning is performed using learning data obtained by a pair of correct image data and input image data, which are generated under conditions of different tones (16-bit tones=65536 colors, 8-bit tones=256 colors, or 1-bit tones=2 colors) or different compression ratios. Here, for another data format to be generated, all combinations of pairs of input image data and correct image data may be included such that all data formats receivable by the image processing apparatus 110 can be converted into data formats that satisfy conditions recommended by the OCR engine.

To convert data into image data of high quality, the neural network needs to be learned using a large amount of learning data. A description will be made here assuming that the neural network has already sufficiently be learned.

FIG. 6 is a flowchart for explaining image processing by the image processing server 130 in step S414 of FIG. 4. Note that the processing shown in FIG. 6 is image processing performed by the image processing server 130 for image data restoration or information extraction, as described above, and this processing is achieved by executing, by the CPU 261, a program deployed on the RAM 264.

First, in step S601, the CPU 261 obtains, as received image data, document image data of low quality, which is FAX image data or scan image data received from the image processing apparatus 110 in step S413 of FIG. 4. Additionally, the CPU 261 obtains, as received image information, a resolution, tones, channel count, compression method, and the like, which are the attribute information of the image data. The process advances to step S602, and the CPU 261 selects and obtains a predetermined learning model stored in the image processing server 130 in step S405 of FIG. 4. As for the learning model selected here, attribute information concerning the image data obtained in step S601, that is, the conditions of deteriorated image data such as a resolution, tones, channel count, and compression method are referred to, and a learning model having input image data conditions that match the conditions of the deteriorated image data is selected. The process advances to step S603, and the CPU 261 inputs the deteriorated image data obtained in step S413 as input image data to the learning model obtained in step S602, thereby obtaining output image data as restored image data.

The process advances to step S604, and the CPU 261 executes form recognition processing for the deteriorated image data obtained in step S413 or the restored image data generated in step S603. Details of the form recognition processing will be described later with reference to FIGS. 7A and 7B. The process advances to step S605, and the CPU 261 executes OCR processing for the deteriorated image data obtained in step S413 or the restored image data generated in step S603, extracts item information included in the form, and outputs it as a text. Note that for the OCR processing used here, a processing module may be selected and used in accordance with the type of a character included in the target form so that type OCR processing is performed if the form collated in step S604 is a type form, and handwriting OCR processing is performed if the form is a handwritten form. Also, the OCR target area of form image data may be limited based on the form collated in step S604, and OCR processing may be executed for the area. When the OCR area is limited, the OCR accuracy for a character string or the like close to a ruled line can be improved.

The process advances to step S606, and the CPU 261 stores the restored image data generated in step S603 in a storage location of the RAM 264 or the storage 265. At this time, automatic file name addition, automatic storage destination selection, and the like can be performed based on the form recognition result obtained in step S604 and the OCR result obtained in step S605. Note that these settings are done by the user in advance. The process advances to step S607, and the CPU 261 stores the extracted text output in step S605 as input data to a predetermined task system.

More specifically, for example, as shown in an order form image 801 in FIG. 8A, if the values of extracted texts corresponding to items (keys) "merchandise name", "quantity", and "unit price" are "part A", "200", and "450", the following processing is performed. That is, the values of the extracted texts are input and saved in the input columns of corresponding items in the task system. The process advances to step S608, and the CPU 261 determines whether another form for which image processing should be executed exists. Upon determining that another form exists, the process returns to step S601 and the CPU 261 repetitively executes the above-described processes of steps S601 to S607. Upon determining that no other form exists, the image processing is ended.

Form recognition processing by the image processing server 130 in step S604 of FIG. 6 will be described next with reference to FIGS. 7A and 7B.

Figure 7A:
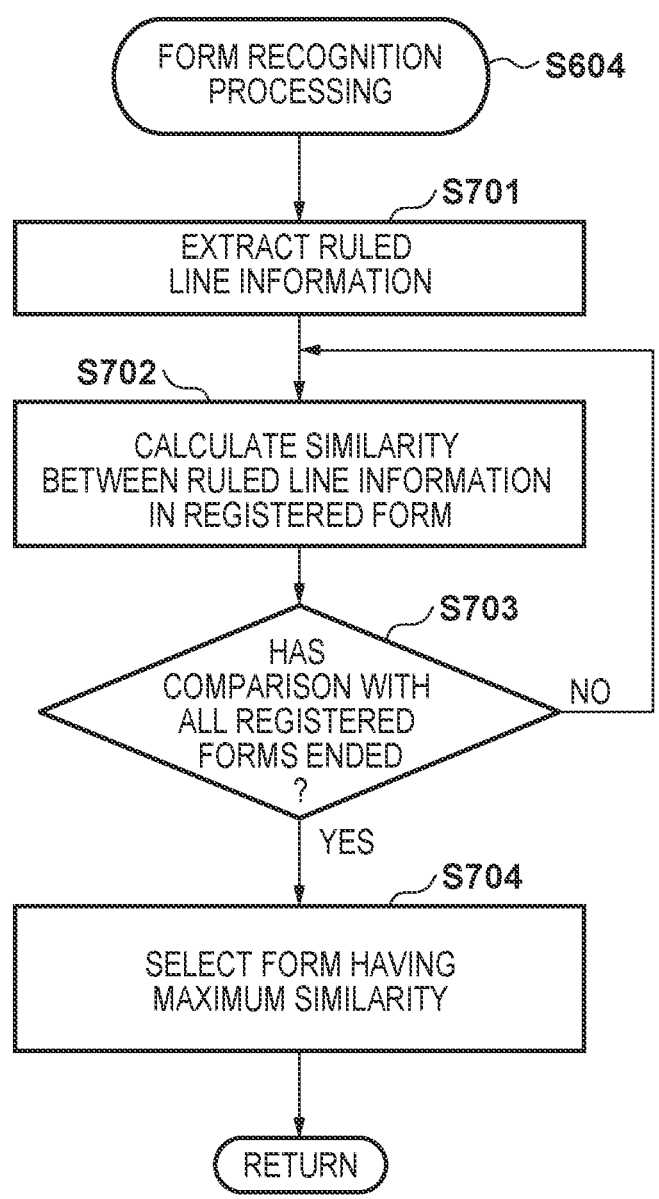
FIG. 7A is a flowchart for explaining form recognition processing in step S604 of FIG. 6, which is performed by the image processing server according to the first embodiment.

FIG. 7A is a flowchart for explaining form recognition processing in step S604 of FIG. 6, which is performed by the image processing server 130 according to the first embodiment. FIG. 7B shows an example of form image data and ruled line information of form IDs 1 to 3 registered in advance in a form database. Note that each ruled line information is shown as an image for the sake of easy understanding. However, the information is stored as data such as the coordinates of end points, thickness, and color information of each line segment.

Referring to FIG. 7A, first, in step S701, the CPU 261 extracts ruled line information from processing target image data. More specifically, after preprocesses such as noise processing by filter processing, background color removal, binarization processing, and edge detection processing are performed, line segment detection is performed, thereby extracting ruled line information included in the image data. The process advances to step S702, the CPU 261 calculates the similarity between the ruled line information extracted in step S701 and pieces of ruled line information 721 to 723 in form images 711 to 713 registered in advance in the form database shown in FIG. 7B. The process advances to step S703, and the CPU 261 determines whether or not comparison with all form images registered in advance in the form database has been executed. Upon determining that a form that has not been compared yet exists, the process advances to step S702 and the CPU 261 repetitively executes the above-described processes of steps S702 and S703. On the other hand, upon determining that comparison with all form images is completed, the process advances to step S704, and the CPU 261 specifies a form having the maximum similarity from the similarities of all forms calculated in step S702, and notifies the user of the specified form as a form recognition result.

Detailed examples will be described next with reference to FIGS. 8A to 10D.

FIG. 8A shows the image data of an order form corresponding to the order form image 711 shown in FIG. 7B. This image data is the form image (correct image data) 801 without image deterioration, which is obtained after RIP of PDL data. FIG. 9A shows form image data (input image data) 901 with image deterioration, which is obtained by receiving the FAX-transmitted form image 801 in step S601. FIG. 10A shows a form image (restored image data) 1001 obtain by restoring the form image data 901 in step S603. FIGS. 8B, 9B, and 10B are enlarged views of ruled line areas at the common position in the form image data. FIGS. 8C, 9C, and 10C show ruled line information extracted from the form images in step S701. FIGS. 8D, 9D, and 10D show examples of determination results of similarities of all registered form documents, which are calculated in step S702.

In the correct form image data 801, since the ruled lines are not deteriorated, as indicated by ruled line areas 802 and 803 in FIG. 8B, ruled line information 804 is sufficiently detected, as shown in FIG. 8C. As a result, as shown in FIG. 8D, the order form image 711 of the form ID "1", which has the maximum similarity, can correctly be obtained as the form recognition result.

On the other hand, in the input image data 901 shown in FIG. 9A, which is obtained by FAX reception, ruled lines are partially lost or given noise to make the thickness uneven, resulting in deterioration of line segments, as indicated by ruled line areas 902 and 903 in FIG. 9B. Hence, ruled line information 904 cannot sufficiently be detected, as shown in FIG. 9C. As a result, as shown in FIG. 9D, the transmittal letter 712 of the form ID "2" (FIG. 7B), which has the maximum similarity, is erroneous recognized as the form recognition result.

On the other hand, in the restored image 1001 shown in FIG. 10A, which is restored in step S603, the lost ruled lines are compensated, and the thickness of each line segment is made even, that is, the image quality of the deteriorated image data is increased, as indicated by ruled line areas 1002 and 1003 in FIG. 10B. As a result, as shown in FIG. 10C, the extraction accuracy of ruled line information 1004 largely improves, and as shown in FIG. 10D, the similarity of the order form image 711 of the form ID "1" (FIG. 7B) becomes highest, and correct determination can be performed.

A method of generating a learning model for restoring ruled line information by the learning apparatus 120 according to the fist embodiment will be described next.

As described above, to improve the form recognition accuracy, the restoration accuracy of ruled line information lost by image deterioration is important. For this purpose, the learning data generation unit 121 of the learning apparatus 120 applies simulation processing of reproducing image quality deterioration in step S403, thereby generating input image data whose ruled line information is lost by FAX reception or the like, as shown in FIG. 11.

FIG. 11 depicts a view showing examples of learning models each of which links input image data that is deteriorated image data with correct image data in the first embodiment.

The learning unit 122 repetitively executes steps S502 to S504 using the learning data 306 that pairs correct image data after RIP with input image data that reproduces the above-described loss of ruled lines. Thus, a learning model that learns the correction tendency from the input image data to the correct image data is generated.

If unknown form image data is input, the thus generated learning model can perform, for each local area of the image data, optimum ruled line correction processing based on a lot of various ruled line deterioration patterns that have been learned and the correction tendency. With this, even greatly deteriorated ruled lines that can hardly be restored by correction using a conventional algorithm can be restored, as indicated by the ruled line areas 1002 and 1003 in FIG. 10B. Note that the greatly deteriorated ruled lines are, for example, line segments that are difficult to detect, as indicated by the ruled line areas 902 and 903 in FIG. 9B.

As described above, according to the first embodiment, processing of increasing image quality is applied to received image data of low quality, thereby restoring ruled line information lost by deterioration and improving the form recognition accuracy. In addition, since a form can be accurately specified, workflow switching after that, automatic file name addition and automatic storage destination setting based on the type of the recognized form, narrow-down of an OCR target area, and the like are also possible, resulting in improvement of the task efficiency.

Second Embodiment

In the above-described first embodiment, a learning model aiming at restoring ruled line information is generated, and the image quality of ruled line information is thus raised, thereby improving the form recognition accuracy. In the second embodiment, a learning model capable of improving the OCR accuracy by raising the image quality of a character shape is further provided. This can improve both the form recognition accuracy and the OCR accuracy. Note that the arrangement of an image processing system according to the second embodiment and the hardware arrangements of an image processing apparatus 110, a learning apparatus 120, an image processing server 130, and the like are the same as in the above-described first embodiment, and a description thereof will be omitted.

FIG. 12A depicts a view showing an example of learning data used by the learning apparatus 120 according to the second embodiment to generate a learning model for restoring a character shape.

In the characters of received image data, character shape deterioration derived from noise, character collapse, and the like has occurred. Hence, the OCR accuracy is low. To accurately execute OCR, it is important to restore a deteriorated character shape, and a learning model suitable for improvement of the image quality of a character shape is necessary.

A learning data generation unit 121 of the learning apparatus 120 according to the second embodiment applies simulation processing of reproducing image quality deterioration in step S403. With this processing, input image data including character shape deterioration as shown in FIG. 12A, such as uneven noise 1201 that has occurred on a character outline, aliasing 1202 of a line caused by resolution lowering, and a character collapse 1203, is generated. Next, as in the above-described first embodiment, a learning unit 122 repetitively executes steps S502 to S504 in FIG. 5 according to the first embodiment using learning data 306 that pairs correct image data after RIP with input image data in which the character shapes are deteriorated. Thus, a learning model that learns the correction tendency from the input image data to the correct image data is generated.

The effect of improving image quality by the learning model generated by the above-described learning data will be described next with reference to FIG. 12B. When the learning model is applied to deteriorated image data 1211 and 1213 shown in FIG. 12B, restored image data 1212 and 1214 in which image quality deterioration caused by the character collapse or noise is eliminated can be generated. An extracted text as an OCR result is output for each of the deteriorated image data 1211 and 1213 and the restored image data 1212 and 1214. Here, for example, as the OCR results of the deteriorated image data 1211 and 1213 of a kanji character "源" and "D", the characters are erroneously recognized as a kanji character "瀬", and "O", respectively. To the contrary, as the OCR results of the restored image data 1212 and 1214, the characters can correctly be recognized as the kanji character "源" and "D". As can be seen, when the learning model for improving the image quality of the character shape is applied, the OCR accuracy can be improved.

Figure 13:
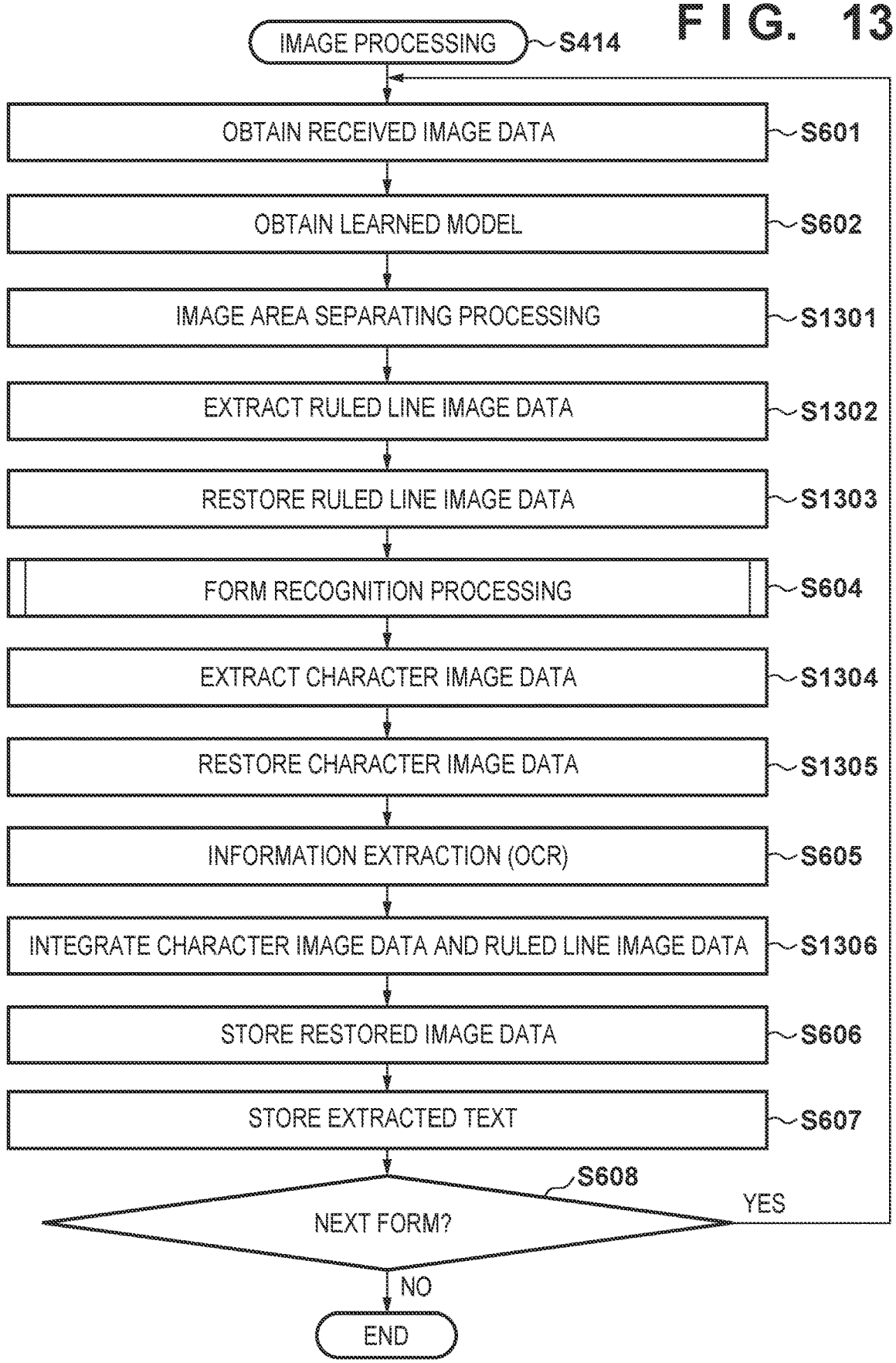
FIG. 13 is a flowchart for explaining image processing (step S414) by an image processing server according to the second embodiment.

FIG. 13 is a flowchart for explaining image processing (step S414) by the image processing server 130 according to the second embodiment. Note that the processing shown in FIG. 13 is achieved by executing, by a CPU 261, a program deployed on a RAM 264 of the image processing server 130, as described above. Note that the same step numbers as in FIG. 6 described above denote the same processes in FIG. 13.

First, in step S601, the CPU 261 obtains image data and attribute information received from the image processing apparatus 110 in step S413 of FIG. 4. The process advances to step S602, and the CPU 261 obtains a learned model stored in the image processing server 130. The learning model obtained here is a learning model including a learning model generated in the first embodiment to improve the image quality of ruled line information and a learning model generated in the second embodiment to improve the image quality of a character shape.

The process advances to step S1301, and the CPU 261 performs image area separating processing for the image data received in step S601, thereby detecting image area information for each pixel. Area attributes detected here are character, ruled line (table), and image. Next, the process advances to step S1302, and the CPU 261 extracts ruled line image data formed by pixels having the ruled line attribute. Note that if a ruled line is partially lost in deteriorated image data that is the received image data, it may be impossible to correctly add the ruled line attribute to the lost area by the image area separating processing. Hence, ruled line image data may be generated by extracting pixels having an attribute other than the character attribute. The process advances to step S1303, and the CPU 261 applies the learning model for improving the image quality of ruled line information, which is obtained in step S602, to the ruled line image data obtained in step S1302, as in step S603, thereby performing restoration processing of the ruled line image data. The process advances to step S604, and the CPU 261 performs form recognition processing and specifies the type of the form. The CPU 261 obtains ruled line information for the specified form type or OCR target area information.

Next, the process advances to step S1304, and the CPU 261 extracts character image data from the image data received in step S601. More specifically, character image data formed by the pixels to which the character attribute is added in step S1301 is extracted. To more accurately extract character image data, character image data is preferably extracted by deleting ruled line information obtained in step S604 from the image data received in step S601 or by deleting information other than the OCR target area obtained in step S604. The process advances to step S1305, and the CPU 261 applies the learning model for improving the image quality of the character shape, which is obtained in step S602 to the character image data, thereby performing restoration processing of the character image data. The process advances to step S605, and the CPU 261 performs OCR processing for the character image data with the improved image quality, thereby obtaining character information.

The process advances to step S1306, and the CPU 261 integrates the ruled line image data whose image quality has been improved in step S1303 and the character image data whose image quality has been improved in step S1305, thereby generating restored image data. Note that ruled line image data generated based on the ruled line information obtained in step S604 may be used in place of the restored ruled line image data. The process advances to step S606, and the CPU 261 stores the restored image data restored using the form recognition result obtained in step S604 and character information that is the OCR result obtained in step S605. The process advances to step S607, and the CPU 261 stores text information extracted from the restored image data. The processes of steps S601 to S608 are repeated until all form images are processed.

As described above, according to the second embodiment, received deteriorated image data is separated into a ruled line portion and a character portion. A learning model used to restore lost ruled line information is applied to the ruled line portion, and a learning model used to restore a character shape deteriorated by noise or character collapse is applied to the character portion. This makes it possible to obtain restored image data whose image quality is improved in accordance with each attribute. In addition, since form type recognition and character recognition can be performed based on the restored image data, the form recognition accuracy and the character recognition accuracy can be improved.

Third Embodiment

In the above-described first and second embodiments, a method of increasing the form recognition accuracy and the OCR accuracy by generating learning models aiming at restoring ruled line information and a character shape and applying these to a ruled line portion and a character portion, respectively, has been proposed. In the third embodiment, a learning model used to simultaneously improve the image quality of ruled line information and a character portion is provided. Note that the arrangement of an image processing system according to the third embodiment and the hardware arrangements of an image processing apparatus 110, a learning apparatus 120, an image processing server 130, and the like are the same as in the above-described first embodiment, and a description thereof will be omitted.

Generation of Learning Data

Figure 14A:
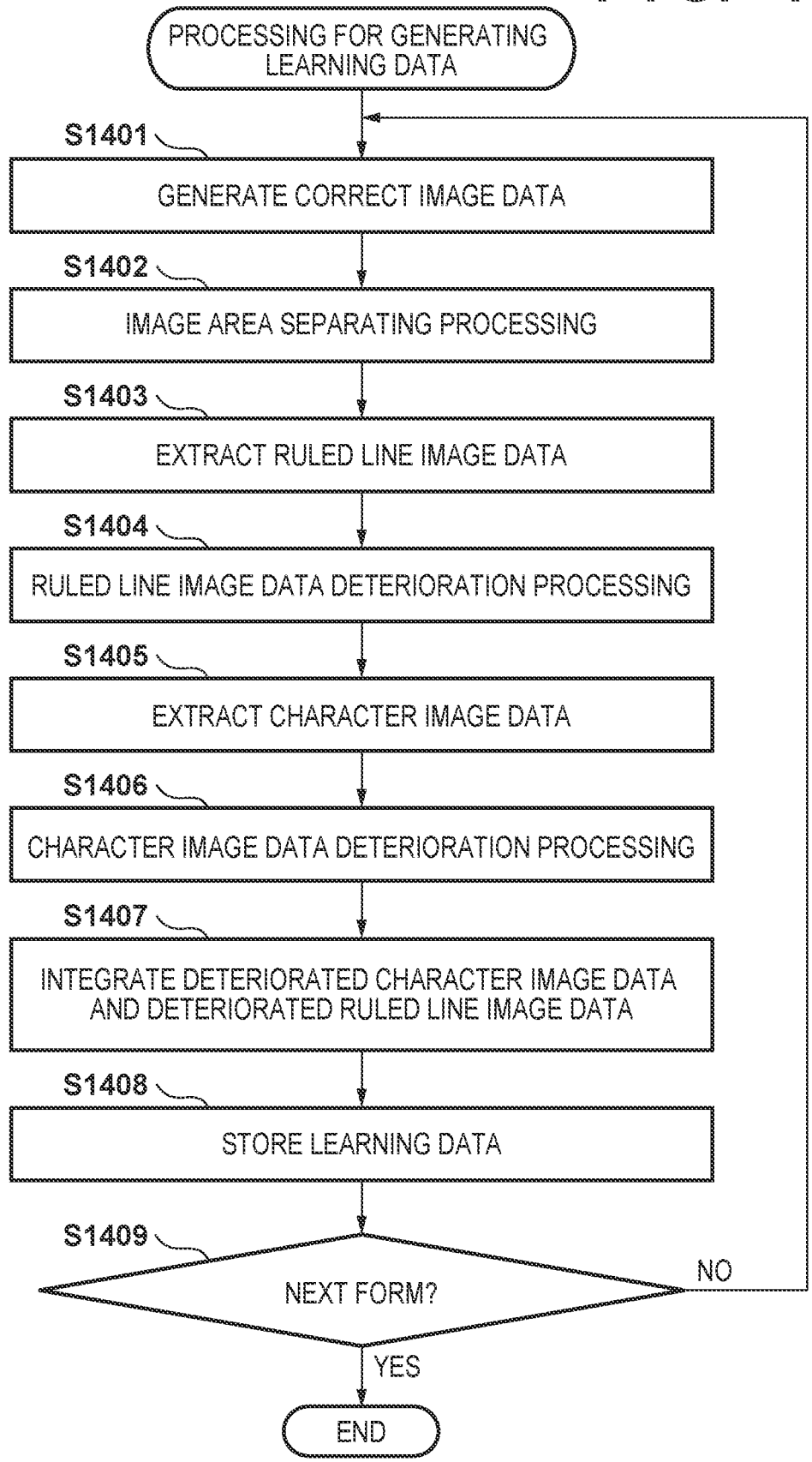
FIG. 14A is a flowchart for explaining learning data generation processing by the learning data generation unit of a learning apparatus according to the third embodiment.

FIGS. 14A and 14B depict views for explaining learning data generation in step S403 according to the third embodiment.

FIG. 14A is a flowchart for explaining learning data generation processing by a learning data generation unit 121 of the learning apparatus 120 according to the third embodiment. Note that the processing shown in this flowchart is implemented by executing, by a CPU 231, a program deployed on a RAM 234. FIG. 14B depicts a view showing an example of image data generated in each processing step shown in FIG. 14A.

First, in step S1401, the CPU 231 of the learning apparatus 120 performs RIP of PDL data 301 (electronic document) transmitted from a terminal apparatus 150, thereby obtaining correct image data 1411. The process advances to step S1402, and the CPU 231 performs image area separating processing for the correct image data 1411, thereby detecting image area information for each pixel. Area attributes detected here are character, ruled line (table), and the like. Next, the process advances to step S1403, and the CPU 231 extracts ruled line image data 1412 formed by pixels having the ruled line attribute. The process advances to step S1404, and the CPU 231 applies simulation processing of reproducing image quality deterioration in which a ruled line is lost, as in the first embodiment, thereby generating deteriorated ruled line image data 1413 whose ruled line information is lost.

The process advances to step S1405, and the CPU 231 extracts character image data 1414 formed by pixels having the character attribute from the correct image data 1411. The process advances to step S1406, and the CPU 231 applies simulation processing of reproducing image quality deterioration including aliasing or collapse of a character, as in the second embodiment, thereby generating deteriorated character image data 1415.

The process advances to step S1407, and the CPU 231 integrates the deteriorated image data generated in steps S1404 and S1406, thereby generating input image data 1416. The process advances to step S1408, and the CPU 231 stores learning data by paring the correct image data 1411 generated in step S1401 with the input image data 1416 generated in step S1407. The process advances to step S1409, and the CPU 231 determines whether or not all form image data have been processed. Upon determining that unprocessed form image data exists, the process advances to step S1401 to repetitively execute the above-described processes of steps S1401 to S1408. On the other hand, upon determining that the processing of all form image data is completed, the learning data generation processing is ended.

Note that all learning data created in the first and second embodiments may be used as the learning data of the third embodiment.

As described above, according to the third embodiment, image data having different features of image quality deterioration are learned as learning data, thereby generating a learning model for compositely improving the image quality of various deterioration patterns.

Hence, when the learning model is used for input image data obtained by deteriorating original image data, image data of high quality suitable for form recognition and OCR can be generated only by one restoration processing. When the thus generated image data of high quality is used, the form and character recognition accuracy can be improved.

Note that in the above-described first to third embodiments, the image processing apparatus 110, the learning apparatus 120, and the image processing server 130 cooperatively execute processing. However, one image processing apparatus may have the functions of the apparatuses 110 and 120 and the server 130.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-174537, filed Sep. 25, 2019, which is hereby incorporated by reference herein in its entirety.

What is claimed is:

1. An image processing apparatus comprising:
at least one memory configured to store instructions; and
at least one processor configured to execute the stored instructions to perform:
obtaining first image data, and second image data generated by deteriorating image quality of the first image data, and generating learning data that links the first image data as correct image data with the second image data as input image data;
learning a neural network using the generated learning data, thereby generating a learning model that is able to convert the input image data to the correct image data;
converting new input image data using the generated learning model to generate output image data; and
specifying a form corresponding to ruled line information included in the output image data.

2. The apparatus according to claim 1, wherein the second image data is generated by applying, to the first image data, processing of losing at least a part of ruled line information included in the first image data.

3. The apparatus according to claim 2, wherein the processing of losing at least a part of the ruled line information includes at least one of losing a ruled line, not making a thickness of the ruled line even, and adding noise to the ruled line and a periphery of the ruled line.

4. The apparatus according to claim 1, wherein the at least one processor executes the instructions to further perform:
executing character recognition processing for the output image data generated using the learning model, thereby obtaining character information included in the output image data; and storing the obtained character information and the output image data.

5. The apparatus according to claim 1, wherein the second image data is generated by applying processing of deteriorating a character shape and ruled line information included in the first image data.

6. The apparatus according to claim 5, wherein the processing of deteriorating the character shape includes at least one of collapse of a part of a character, loss of a part of the character, aliasing of a line that forms the character, and adding of noise to an outline of the character and a periphery of the character.

7. The apparatus according to claim 1, wherein
the output image data is generated by extracting ruled line image data from the new input image data, and by applying the learning model to the extracted ruled line image data.

8. The apparatus according to claim 4, wherein
the output image data is generated by extracting character image data from the new input image data, and by generating the output image data by applying the learning model to the extracted character image data.

9. The apparatus according to claim 1, wherein
the second image data is generated by applying processing of losing at least a part of ruled line information to the first image data and applying processing of deteriorating a character shape included in the first image data.

10. The apparatus according to claim 4, wherein the character recognition processing includes one or both of type OCR and handwriting OCR.

11. The apparatus according to claim 1, wherein in specifying processing of the form, a type of a form most similar to a type of a form registered in advance is specified based on ruled line information included in the output image data.

12. The apparatus according to claim 1, wherein the at least one processor executes the instructions to further perform:
obtaining a character recognition target area linked with the specified form; and
obtaining character information by applying character recognition processing for the character recognition target area in the output image data.

13. The apparatus according to claim 12, wherein the at least one processor executes the instructions to further perform at least one of automatic file name addition and automatic storage destination selection based on the specified form and the obtained character information.

14. A method of controlling an image processing apparatus, comprising:
obtaining first image data, and second image data generated by deteriorating image quality of the first image data, and generating learning data that links the first image data as correct image data with the second image data as input image data;
learning a neural network using the generated learning data, thereby generating a learning model that is able to convert the input image data to the correct image data;
converting new input image data using the generated learning model to generate output image data; and
specifying a form corresponding to ruled line information included in the output image data.

15. The method according to claim 14, further comprising:
executing character recognition processing for the output image data generated using the learning model, thereby obtaining character information included in the output image data; and
storing the obtained character information and the output image data.

16. An image processing system comprising:
a learning apparatus configured to obtain first image data, and second image data generated by deteriorating image quality of the first image data, generate learning data that links the first image data as correct image data with the second image data as input image data, learn a neural network using the generated learning data, thereby generating a learning model that is able to convert the input image data to the correct image data, convert new input image data using the generated learning model to generate output image data, and specify a form corresponding to ruled line information included in the output image data, and
an image conversion apparatus configured to convert the input image data using the learning model generated by the learning apparatus to generate output image data.

17. A non-transitory computer-readable storage medium storing a program for causing a processor to execute a method of controlling an image processing apparatus, comprising:
obtaining first image data, and second image data generated by deteriorating image quality of the first image data, and generating learning data that links the first image data as correct image data with the second image data as input image data;
learning a neural network using the generated learning data, thereby generating a learning model that is able to convert the input image data to the correct image data;
converting new input image data using the generated learning model to generate output image data; and
specifying a form corresponding to ruled line information included in the output image data.

* * * * *